United States Patent
Solomon et al.

[11] Patent Number: 5,754,450
[45] Date of Patent: May 19, 1998

[54] DETECTION OF FAULTS IN THE WORKING OF ELECTRIC MOTOR DRIVEN EQUIPMENT

[75] Inventors: Alan David Solomon, Omer; Efim Gelman, Dimona, both of Israel

[73] Assignee: Diagnostics Temed Ltd., Arava, Israel

[21] Appl. No.: 605,156

[22] PCT Filed: Sep. 2, 1994

[86] PCT No.: PCT/US94/09894
§ 371 Date: Jun. 17, 1996
§ 102(e) Date: Jun. 17, 1996

[87] PCT Pub. No.: WO95/07451
PCT Pub. Date: Mar. 16, 1995

[30] Foreign Application Priority Data
Sep. 6, 1993 [IL] Israel ......................... 106916

[51] Int. Cl.⁶ ................................. G01R 19/165
[52] U.S. Cl. .................. 364/551.01; 324/772; 340/679; 361/23; 361/31; 361/87; 364/481; 364/483; 364/550
[58] Field of Search ........................ 324/545, 772; 361/23, 24, 30, 31, 87, 94; 364/480, 481, 483, 485, 550, 551.01; 340/679, 680

[56] References Cited

U.S. PATENT DOCUMENTS

| | | | |
|---|---|---|---|
| 2,611,017 | 9/1952 | Bailey | 177/311 |
| 2,786,989 | 3/1957 | Smith, Jr. | 340/213 |
| 3,039,086 | 6/1962 | Inc., et al. | 340/223 |
| 4,123,009 | 10/1978 | Kilpinen | 241/30 |
| 4,380,172 | 4/1983 | Imam et al. | 73/659 |
| 4,527,247 | 7/1985 | Kaiser et al. | 364/550 |
| 4,581,711 | 4/1986 | Hirata et al | 364/550 |
| 4,965,513 | 10/1990 | Haynes et al. | 324/158 MG |
| 4,996,655 | 2/1991 | Chadwick et al. | 364/550 |
| 5,134,574 | 7/1992 | Beaverstock et al. | 364/551.01 |
| 5,187,417 | 2/1993 | Minnich et al. | 318/254 |
| 5,519,337 | 5/1996 | Casada | 324/772 |
| 5,594,180 | 1/1997 | Carpenter et al. | 73/861.356 |

*Primary Examiner*—Edward R. Cosimano
*Attorney, Agent, or Firm*—Ladas & Parry

[57] ABSTRACT

Apparatus for monitoring the functioning of motor driven equipment, including current sensing apparatus connectable to the power input of the motor and producing a current signal; signal correction apparatus receiving as input the current signal and operative to demodulate the current signal, filter the current signal to retain low frequencies thereof, and convert the current signal from analog to digital form and producing a corrected signal; a memory; a controller in operative connection with the memory, receiving the corrected signal, and having a calibration state and an operation state, and operative, when in the calibration state, to compute the calibration norm of the corrected signal based partly on data contained in the memory and to store the calibration norm in the memory and operative, when in the operation state, to compute the operation norm of the corrected signal based partly on data contained in the memory and to compare the operation norm with the stored calibration norm and to produce a function signal indicating the functioning of the motor driven equipment; and an indicating unit receiving as input the function signal and producing an output indication of the functioning of the motor driven equipment.

25 Claims, 14 Drawing Sheets

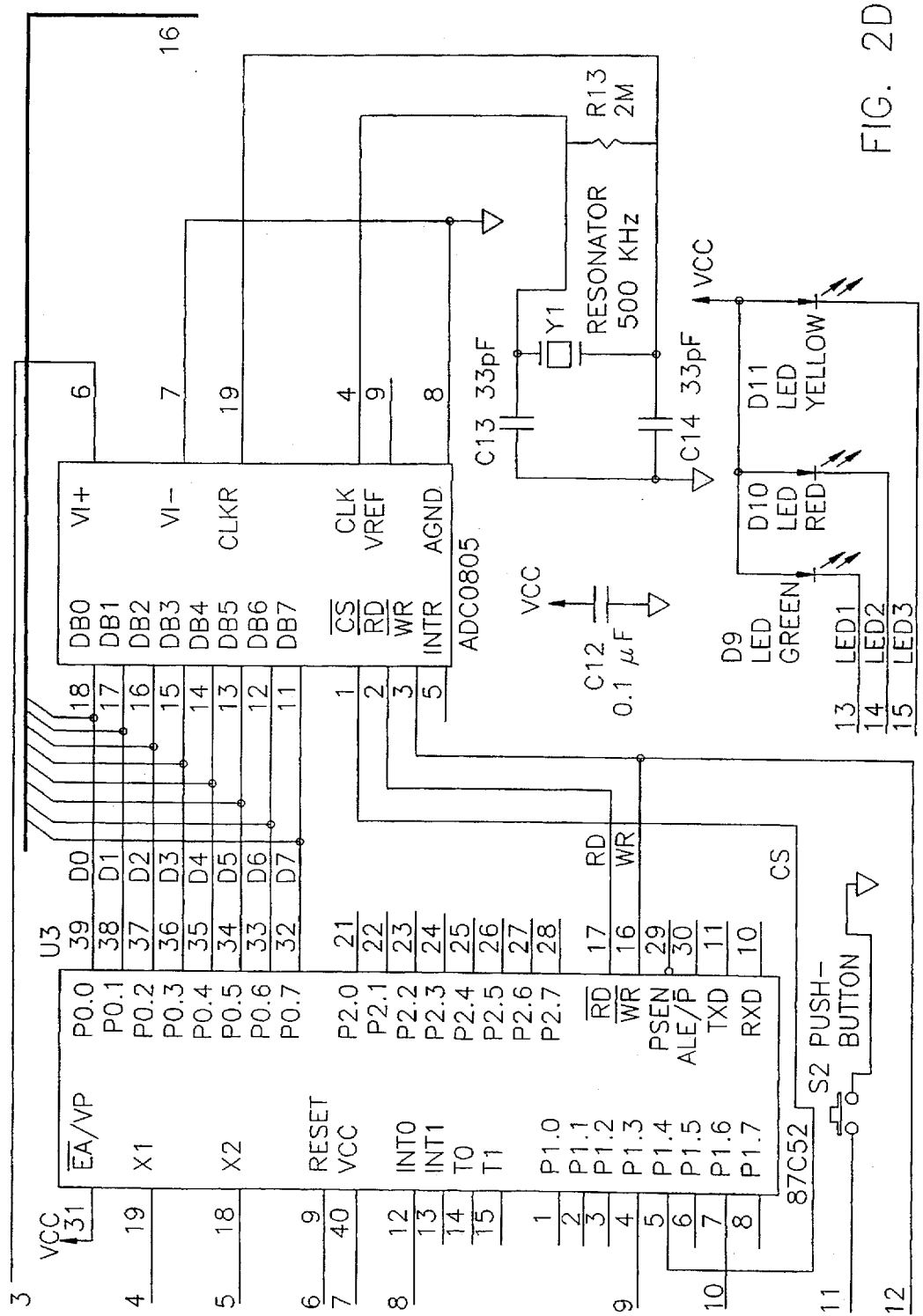

DETECTION OF FAULTS IN THE WORKING OF ELECTRIC MOTOR DRIVEN EQUIPMENT

FIELD OF THE INVENTION

The present invention relates to the detection of faults in the working of electric motor driven equipment.

BACKGROUND OF THE INVENTION

The term "motor driven equipment" is used herein to refer to any piece of equipment consisting of an electric motor, together with one or more devices driven by the electric motor and imposing a load on the motor shaft. Examples of motor driven equipment include a compressor in a refrigeration or cooling/heating device, a fan in air moving equipment and a pump driving a fluid through a pipe.

For compressors, pumps, fans and other motor driven equipment it is of vital importance to be able to carry out early identification of incipient performance problems or faults for such concerns as security, health, production, etc.

Fault detection devices can be roughly divided into two classes: those not requiring direct contact with the equipment, and those that do. The former includes so-called "passive" approaches wherein direct contact is not required while the latter includes devices based on, e.g., vibration analysis for mechanical failures and gas detectors for leaks. Such intrusive devices have inherent weaknesses that often stem from the need for physical contact or closeness to the equipment. Thus vibration sensors must be positioned correctly with respect to the (possibly unknown) directions of vibrations, while gas sensor locations are limited to non-ventilated spaces and are not effective for equipment placed for example, on a roof.

Fault detection devices not requiring direct contact are known in the prior art. An example of an approach which does not require direct contact with the equipment is that of Motor Current Signature Analysis, described in U.S. Pat. No. 4,965,513 to Haynes et al. This method, referred to herein as "MCSA", works as follows:

It is known that the characteristics of the electric current powering an electric motor which in turn operates a piece of equipment reflect the mechanical load of the equipment on the motor shaft. Therefore, the current values may be analyzed with standard spectral analysis, such as by applying the discrete Fourier Transform to a demodulated current signal and computing the power spectrum of the signal. Thus one attempts to obtain a "current signature" which will be different if the equipment is undergoing a change in mechanical behavior due to an incipient breakdown.

Since MCSA requires only values characterizing the electricity it is inherently a passive, non-intrusive approach, not requiring direct contact with the equipment and hence offering the convenience resulting from this fact.

The spectral analysis of the current, serving as the basis for a current signature whose changes reflect changes in the mechanical behavior of the equipment, is the basis for a number of inventions known in the prior art including those described in U.S. Pat. Nos. 4,123,009 to Kilpinen and 4,380,172 to Imam et al.

The MCSA method consists of storing a (possibly long) sequence of current values in a computer memory and applying the Discrete Fourier Transform with an appropriately chosen window function to the sequence. Of course the actual choice of the window function is based more on experimentation and knowing what one is seeking, than on definitive rules. Indeed the non-definitive nature of the choice renders the MCSA method difficult to implement independently of the intervention of an expert.

As a preliminary step in MCSA one will normally demodulate the signal with respect to the line current frequency for an A.C. power source. From the Discrete Fourier Transform we find the power spectrum, a positive real function of the frequency. Attempts will be made to associate various peaks in the spectrum with mechanical features of the equipment/motor combination.

Significant amplitude values are now stored in memory for data collected when operation was normal. The values will normally correspond to slip and r.p.m. values of the motor as well as to other mechanically-related features. For data collected at a later time we will again find the power spectrum and compare its key features with those stored during the earlier "calibration" stage. By visual observation we determine if differences between the spectra, buttressed by additional input of the current values and known mechanical features, justify concluding that particular performance problems have arisen in the equipment.

The MCSA approach has deficiencies that limit its effectiveness in certain situations. The first is that it requires extensive computing capability for Discrete Fourier Transform evaluation, together with memory sufficient for large vectors; similarly it is a "linear" operation because of the linear nature of the Fourier Transform while the operations taking place in motor-driven equipment are basically non-linear. In the same vein it is "frequency oriented", with limited capability to identify effects with low power that might be associated with current values assumed over brief intervals of time.

Thus, while the Fourier Transform and Power Spectrum analysis have a strong traditional appeal for periodic processes, they will be inherently limited to the strong signal qualities of the slip and rotor speed in analyzing equipment performance. Finally, as noted above, the need for a window function makes it difficult to implement the method in the form of an autonomous, stand-alone device that does not require human intervention.

SUMMARY OF THE INVENTION

The present invention seeks to provide an improved apparatus and method for detecting faults in the operation of electric motor-driven equipment.

There is thus provided in accordance with a preferred embodiment of the present invention an apparatus for detecting faults in the working of motor driven components of a heating, cooling or dehumidifying unit, including a housing in which are located a) a current sensor which is connectable to the power lead of the motors of the unit, the sensor being connected to b) a demodulator being connected to c) a low pass filter which is connected to d) an A–D converter which is connected to e) a micro controller containing an appropriate algorithm program, which is connected to f) a memory, both the micro controller and the memory being connected to g) an indicating unit, all the units being connected in an appropriate manner one after another.

Further in accordance with a preferred embodiment of the present invention the current sensor is a current transformer.

Still further in accordance with a preferred embodiment of the present invention the current transformer is of 20 amp.

Additionally in accordance with a preferred embodiment of the present invention the current sensor is a magnetic amplifier.

Further in accordance with a preferred embodiment of the present invention the current sensor is a shunt.

Still further in accordance with a preferred embodiment of the present invention the demodulator is an active rectifier.

Additionally in accordance with a preferred embodiment of the present invention the filter is a 25 Hz cut-off frequency low pass Butterworth filter.

Additionally in accordance with a preferred embodiment of the present invention the A–D converter has at least 6 bits.

Further in accordance with a preferred embodiment of the present invention the A–D converter has 8 bits.

Still further in accordance with a preferred embodiment of the present invention the indicating unit is a display.

Additionally in accordance with a preferred embodiment of the present invention the indicating unit is an alarm unit.

Further in accordance with a preferred embodiment of the present invention the indicating unit is located within the housing.

Still further in accordance with a preferred embodiment of the present invention the indicating unit is located outside the housing.

Additionally in accordance with a preferred embodiment of the present invention the unit is an air conditioning one unit and the algorithm is programmed to detect insufficient refrigerant pressure.

Further in accordance with a preferred embodiment of the present invention the unit is a chiller and the algorithm is programmed to detect clogging of an air filter.

Still further in accordance with a preferred embodiment of the present invention the algorithm is programmed also to detect one or more additional defaults.

There is also provided in accordance with another preferred embodiment of the present invention a method for the detection of faults in the working of a unit (as herein before defined) which method consists in sending a variable voltage signal being proportional to the time-varying current flowing in the power leads from the motor of the unit, which signal is sent and verified via a demodulator, a low pass filter and an A–D converter, to a micro controller, which is fed with a suitable algorithm program in which the signal is checked against the signal recorded in a memory, and then sent to the display unit.

There is also provided in accordance with another preferred embodiment of the present invention fault detection apparatus for detecting faults in the working of motor driven equipment including current sensing apparatus connectable to the power input of the motor and producing a current signal, signal correction apparatus receiving as input the current signal and operative to demodulate the current signal, filter the current signal to retain low frequencies thereof, and convert the current signal from analog to digital form and producing a corrected signal, a memory, a controller in operative connection with the memory, receiving the corrected signal and having a calibration state and an operation state and operative, when in the calibration state, to compute the calibration norm of the corrected signal based partly on data contained in the memory and to store the calibration norm in the memory and operative, when in the operation state, to compute the operation norm of the corrected signal based partly on data contained in the memory and to compare the operation norm with the stored calibration norm and to produce a function signal indicating the functioning of the motor driven equipment, and an indicating unit receiving as input the function signal and producing an output indication of the functioning of the motor driven equipment.

Further in accordance with a preferred embodiment of the present invention the current sensing apparatus includes a magnetic amplifier.

Still further in accordance with a preferred embodiment of the present invention the current sensing apparatus includes a shunt.

Additionally in accordance with a preferred embodiment of the present invention the demodulating apparatus includes an active rectifier.

Further in accordance with a preferred embodiment of the present invention the low pass filter includes a Butterworth filter.

Still further in accordance with a preferred embodiment of the present invention the A–D conversion apparatus has at least 6 bits.

Additionally in accordance with a preferred embodiment of the present invention the A–D conversion apparatus has at least 8 bits.

Further in accordance with a preferred embodiment of the present invention the motor driven equipment includes an air conditioning unit and the controller is operative to detect insufficient refrigerant pressure.

Still further in accordance with a preferred embodiment of the present invention the motor driven equipment includes a chiller and the controller is operative to detect clogging of an air filter.

Additionally in accordance with a preferred embodiment of the present invention the controller is also operative to detect at least one additional defect.

Further in accordance with a preferred embodiment of the present invention the motor driven equipment includes a heat pump.

Still further in accordance with a preferred embodiment of the present invention the heat pump has a plurality of modes of heating and the controller is operative to detect the mode of heating of the heat pump.

Additionally in accordance with a preferred embodiment of the present invention the motor driven equipment includes a fluid pump.

Further in accordance with a preferred embodiment of the present invention the controller is operative to detect the rate of flow of the fluid.

Still further in accordance with a preferred embodiment of the present invention the controller is operative to detect faults in the pump.

Additionally in accordance with a preferred embodiment of the present invention the controller is also operative to control the operation of the pump.

Further in accordance with a preferred embodiment of the present invention the fault detection apparatus also includes a container being fed by the pump, and the controller is operative to detect the level of liquid in the container.

Still further in accordance with a preferred embodiment of the present invention the motor driven equipment includes a fan.

Additionally in accordance with a preferred embodiment of the present invention the motor driven equipment includes refrigeration equipment.

Further in accordance with a preferred embodiment of the present invention the refrigeration equipment includes evaporator coils and the controller is operative to detect the growth of frost on the evaporator coils.

Still further in accordance with a preferred embodiment of the present invention the motor driven equipment includes a rotating member and the controller is operative to detect the rate of rotation (RPM) of the rotating member.

Additionally in accordance with a preferred embodiment of the present invention the indicating unit includes a display.

Further in accordance with a preferred embodiment of the present invention the indicating unit includes an alarm.

There is also provided in accordance with another preferred embodiment of the present invention a fault detection method for detecting faults in the working of motor driven equipment including sensing the current in the power input of the motor and producing a current signal, demodulating the current signal, filtering the current signal to retain low frequencies thereof, and converting the current signal from analog to digital form and producing a corrected signal, receiving the corrected signal, retrieving at least one stored corrected signal from the memory and comparing the corrected signal with the stored corrected signal and producing a function signal indicating the functioning of the motor driven equipment, receiving the corrected signal and having a calibration state and an operation state and, when in the calibration state, computing the calibration norm of the corrected signal based partly on stored data and storing the calibration norm and, when in the operation state, computing the operation norm of the corrected signal based partly on stored data and to comparing the operation norm with the stored calibration norm and producing a function signal indicating the functioning of the motor driven equipment, and receiving the function signal and producing an output indication of the functioning of the motor driven equipment.

BRIEF DESCRIPTION OF THE DRAWINGS

The present invention will be understood and appreciated from the following detailed description, taken in conjunction with the drawings in which:

FIGS. 2A–2D together constitute an electric circuit diagram of a portion of the apparatus of FIG. 1;

Figure 4:
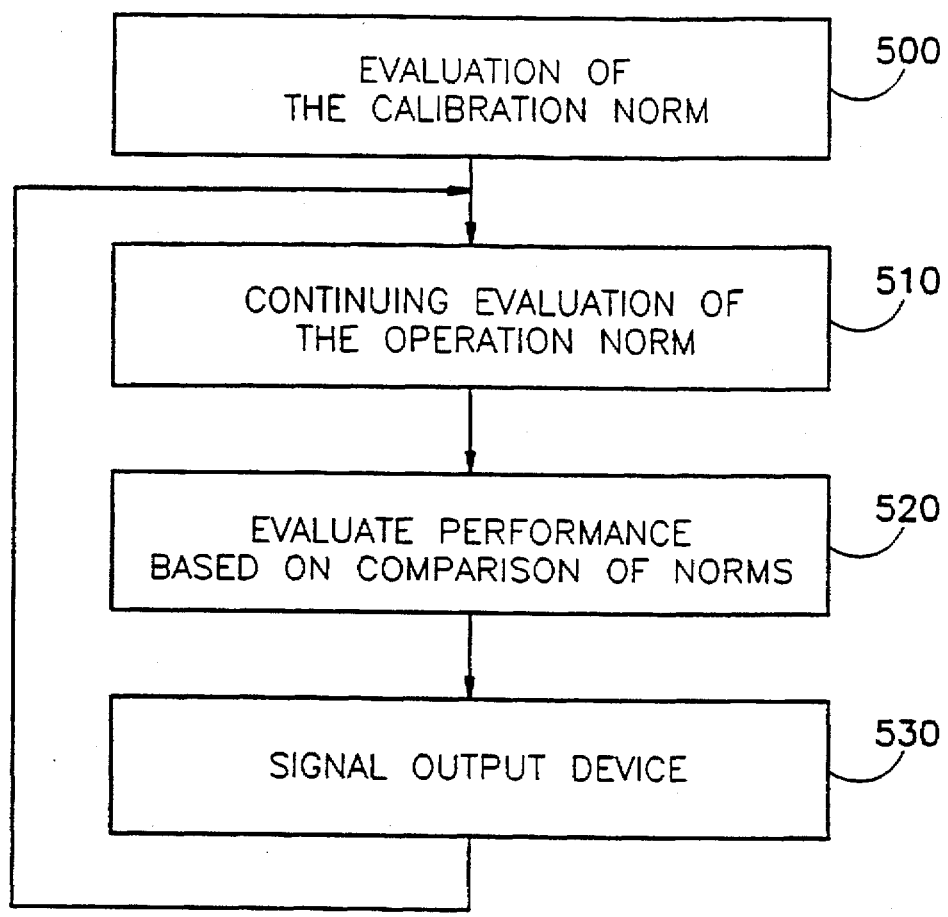
FIG. 4 is a flow chart illustrating an alternative embodiment of the method performed by the apparatus of FIG. 1.
Figure 5A:
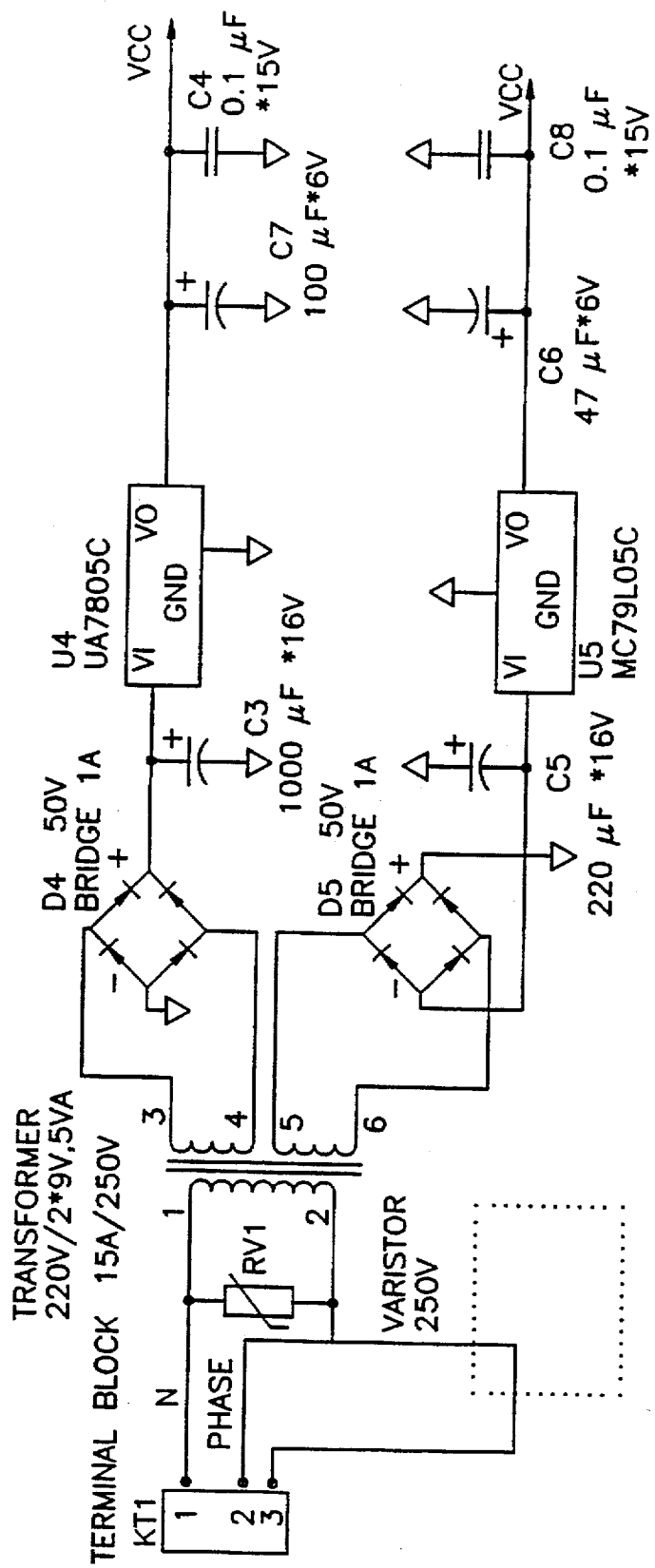
FIGS. 5A–5F together constitute an electronic circuit diagram of an alternative embodiment of a portion of the apparatus of FIG. 1.
Figure 5B:
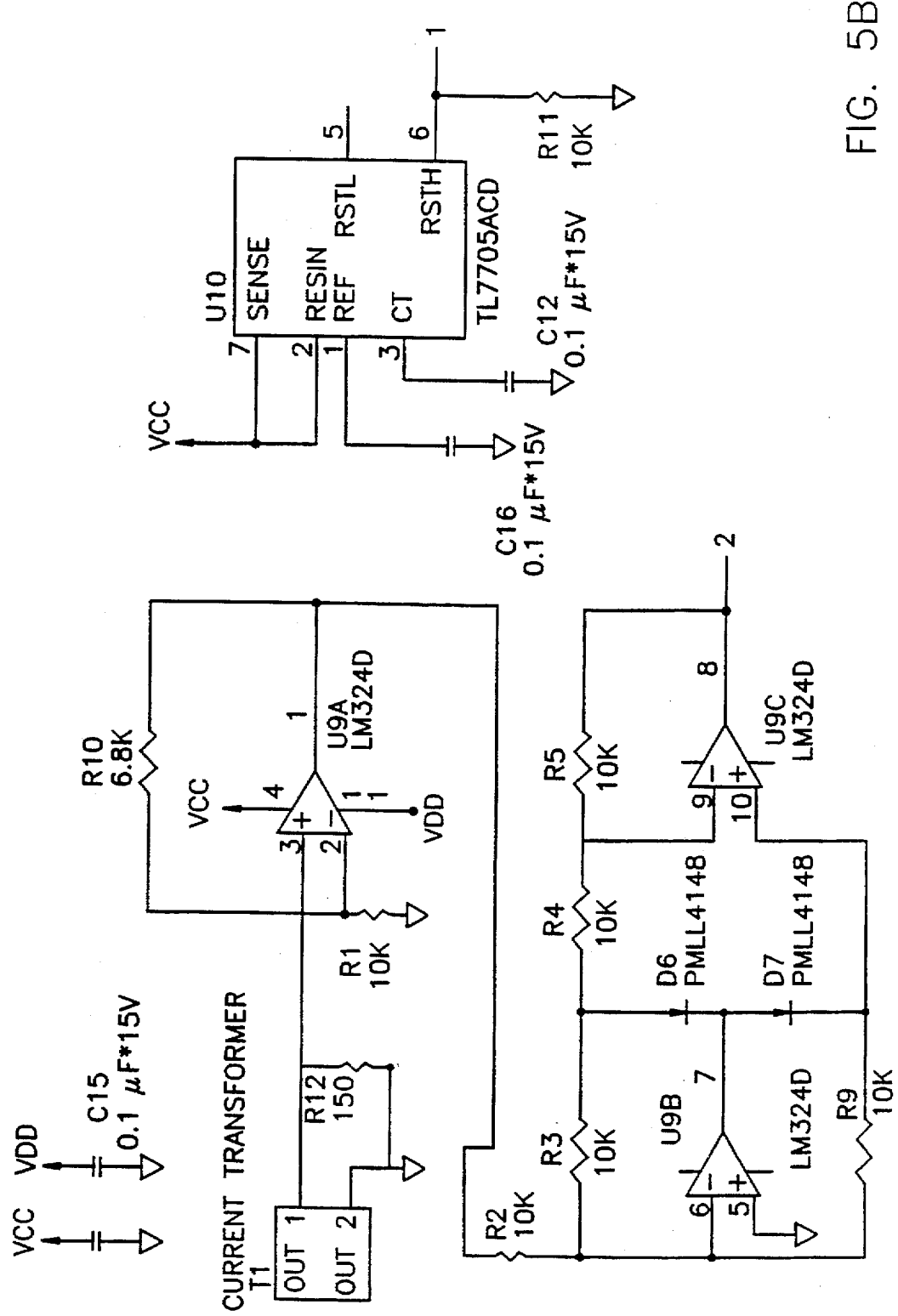
Figure 5C:
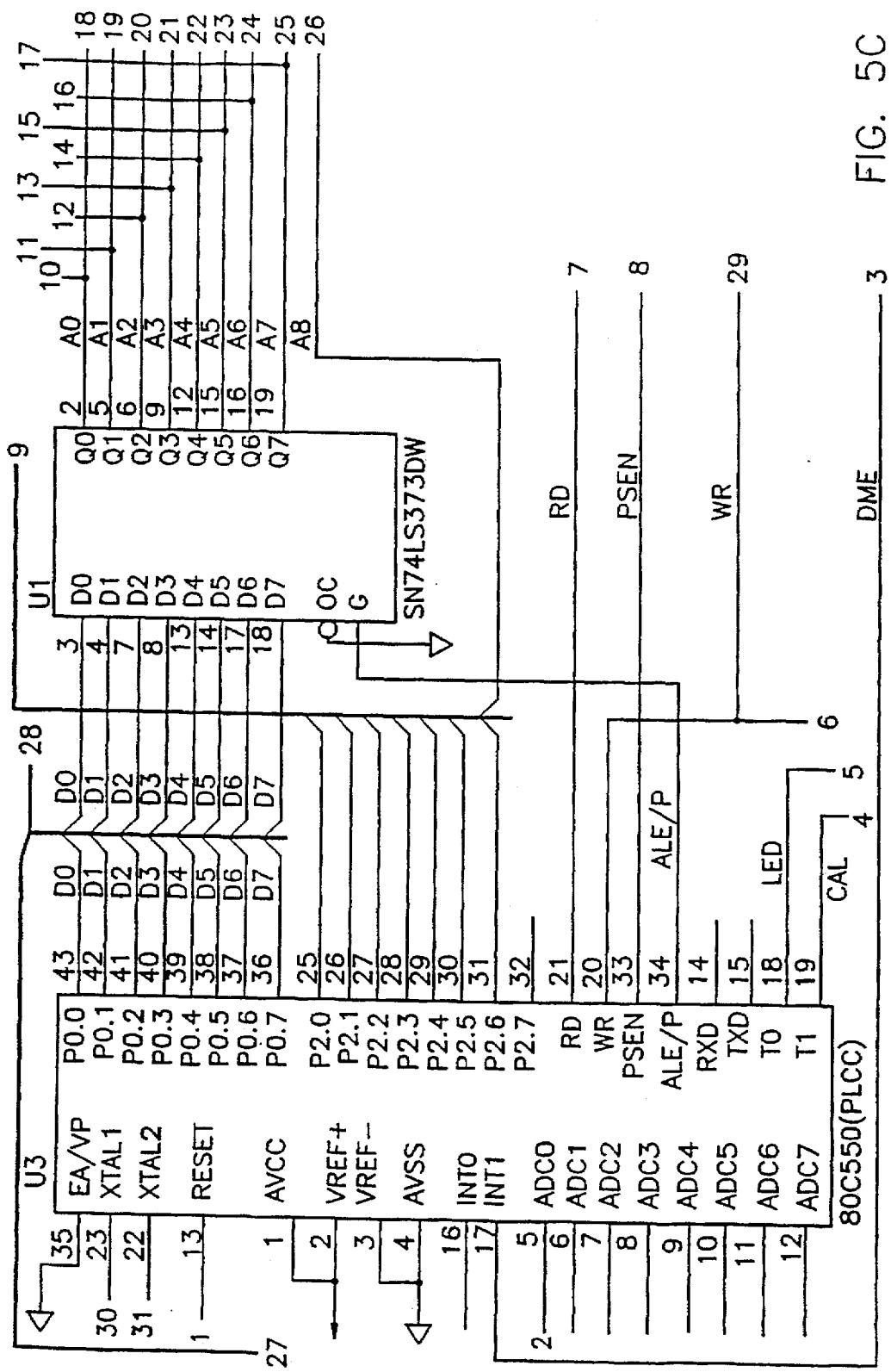
Figure 5D:
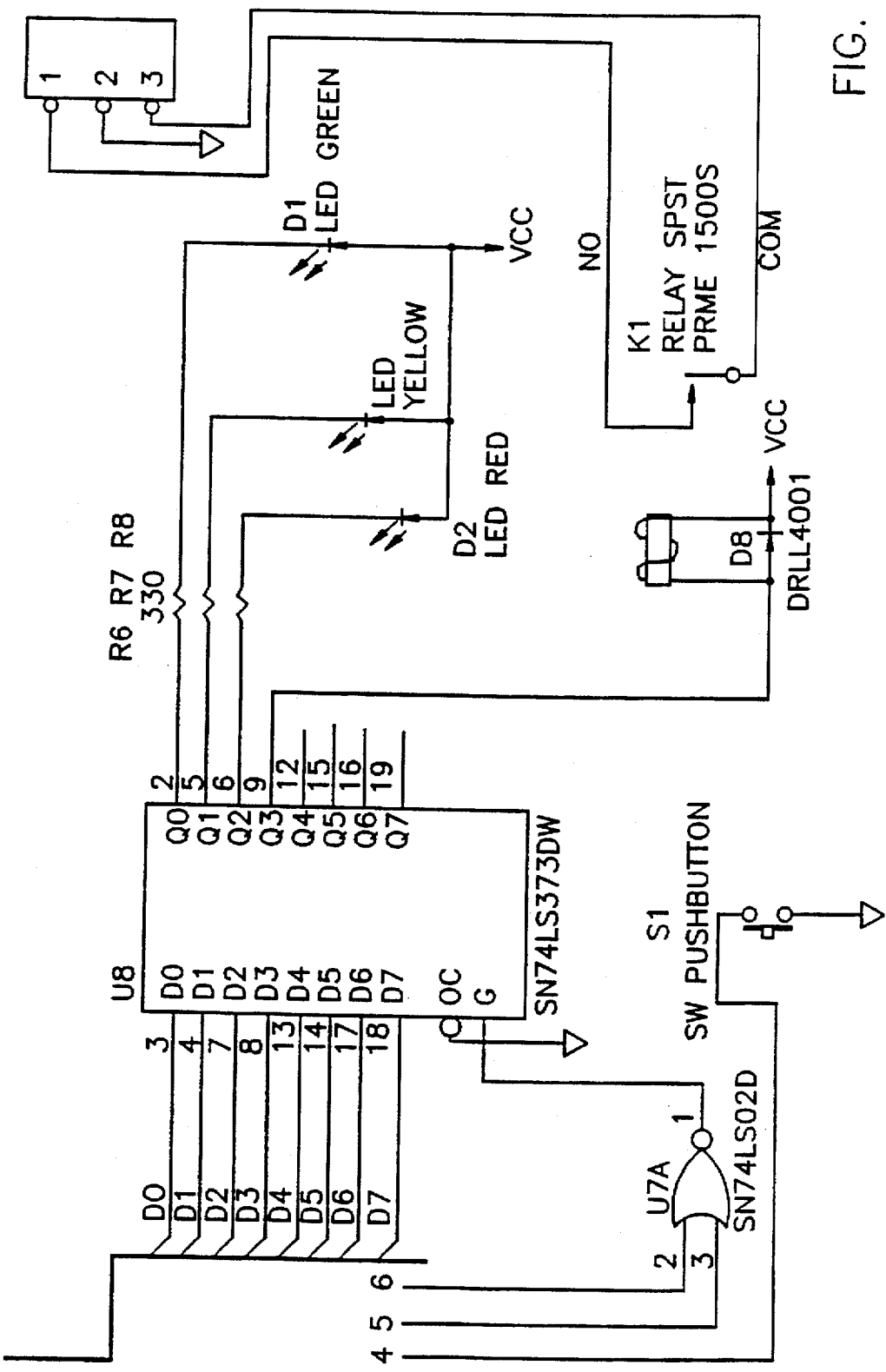
Figure 5E:
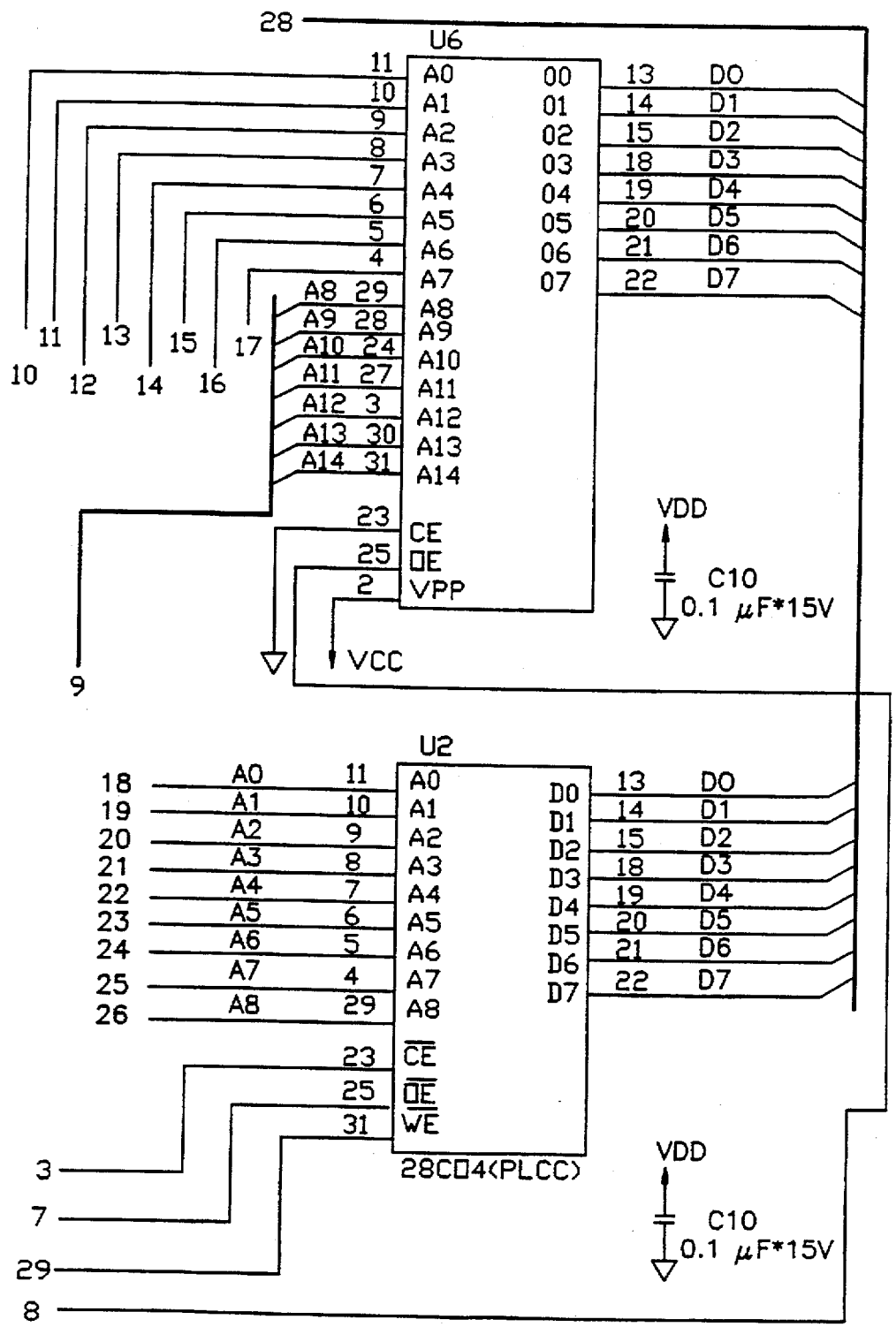
Figure 5F:
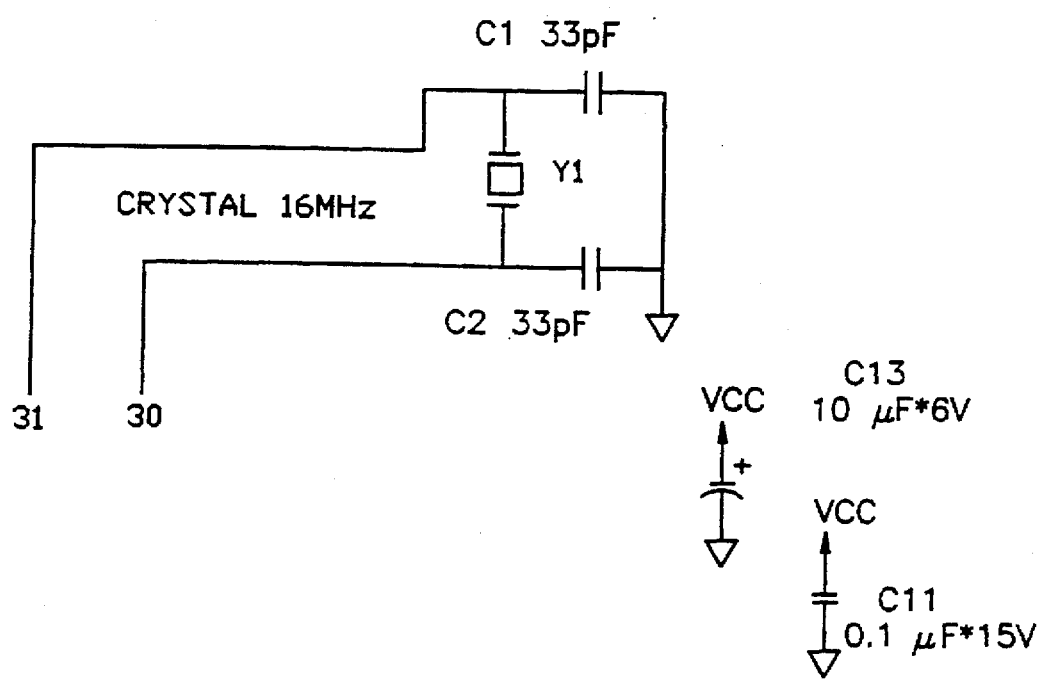

Attached herewith are the following Appendices which aid in the understanding and appreciation of one preferred embodiment of the invention shown and described herein:

Appendix A is a list of the various parts in the circuit diagram of FIGS. 2A–2D;

Appendix B is a list of the various parts in the circuit diagram of FIGS. 5A–5F; and Appendix C is a computer listing of a preferred software implementation of the method of FIG. 4.

DETAILED DESCRIPTION OF PREFERRED EMBODIMENTS

The present invention relates to a method and to an apparatus for detecting faults in the working of motor driven components of heating, cooling or dehumidifying units, e.g. an air conditioning unit, a chiller, a fan coil, refrigerating unit, etc. (Hereinafter called "unit"). The unit will be described herein in particular as an air conditioning unit. However it is not restricted thereto. Such air conditioning may be either a small one used in private homes or a large one used in industrial plants, large halls, and the like.

It is appreciated that the method and apparatus described herein may in fact be used for detecting faults in any motor driven equipment as defined above and need not be limited to use with a unit as defined above.

In the working of air conditioning many faults occur, for example:

a) insufficient refrigerant pressure;

b) air-filter clogging;

c) water in the system;

d) the reverse valve does not operate;

e) the refrigerant filter is clogged;

f) the condenser fan fails;

g) the compressor itself does not work;

h) water freezes in the capillary tube.

It is very often difficult to check and distinguish between such faults and thus a technician has to be called. It has therefore been desirable to design a method and/or a device which would show one or more of such faults as early as possible upon its onset, indicate whether indeed a technician has to be called and aid the technician in identifying the problem. Said device should be simple, relatively cheap and easy to connect to a commercially available air conditioning unit.

Figure 1:
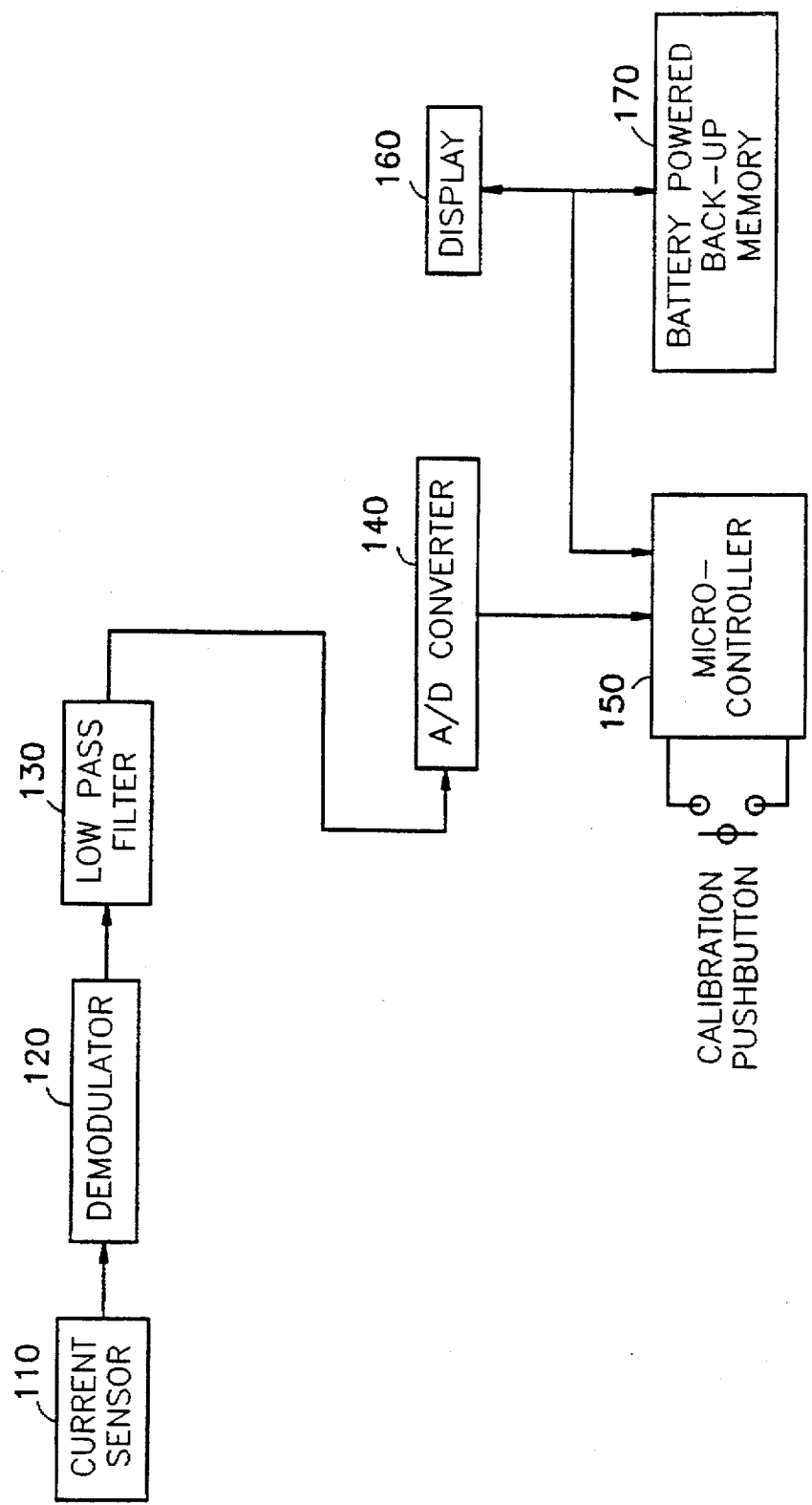
FIG. 1 is a simplified block diagram of an apparatus for detecting faults in the operation of electric motor-driven equipment constructed and operative in accordance with a preferred embodiment of the present invention.
Figure 2A:
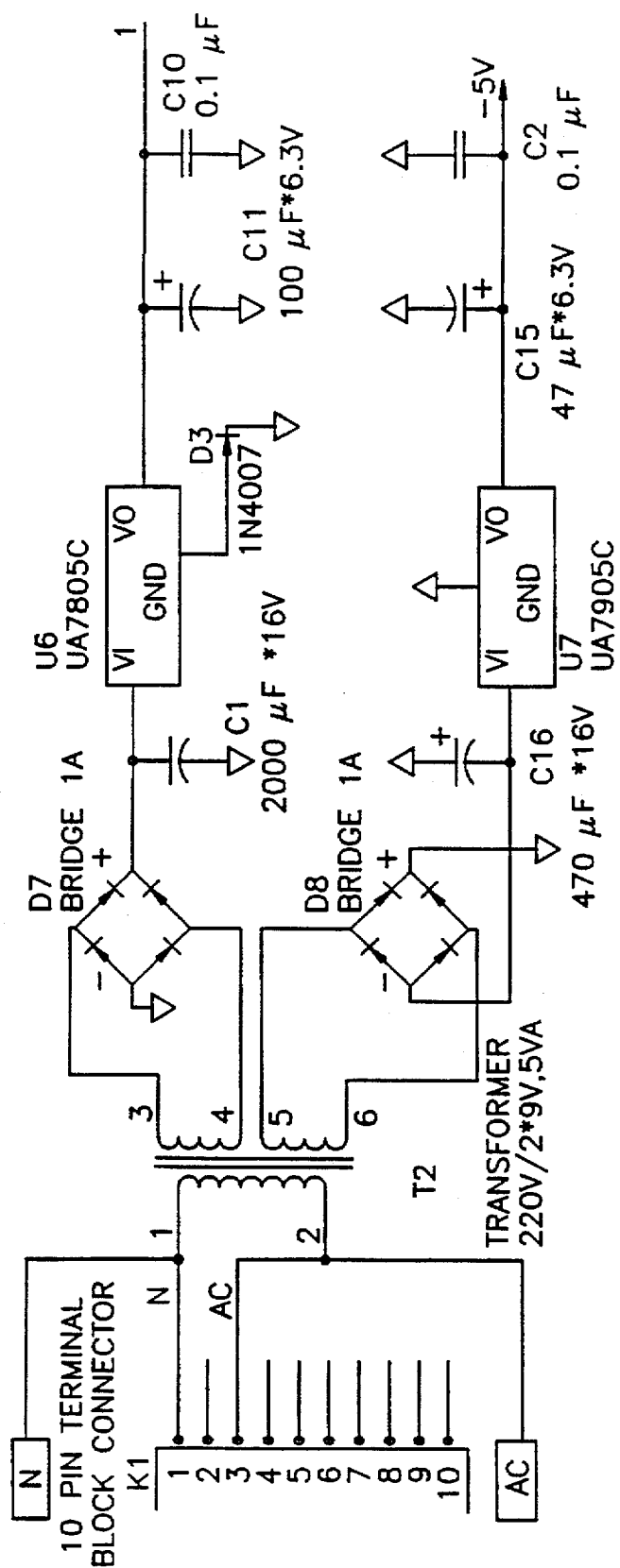
Figure 2B:
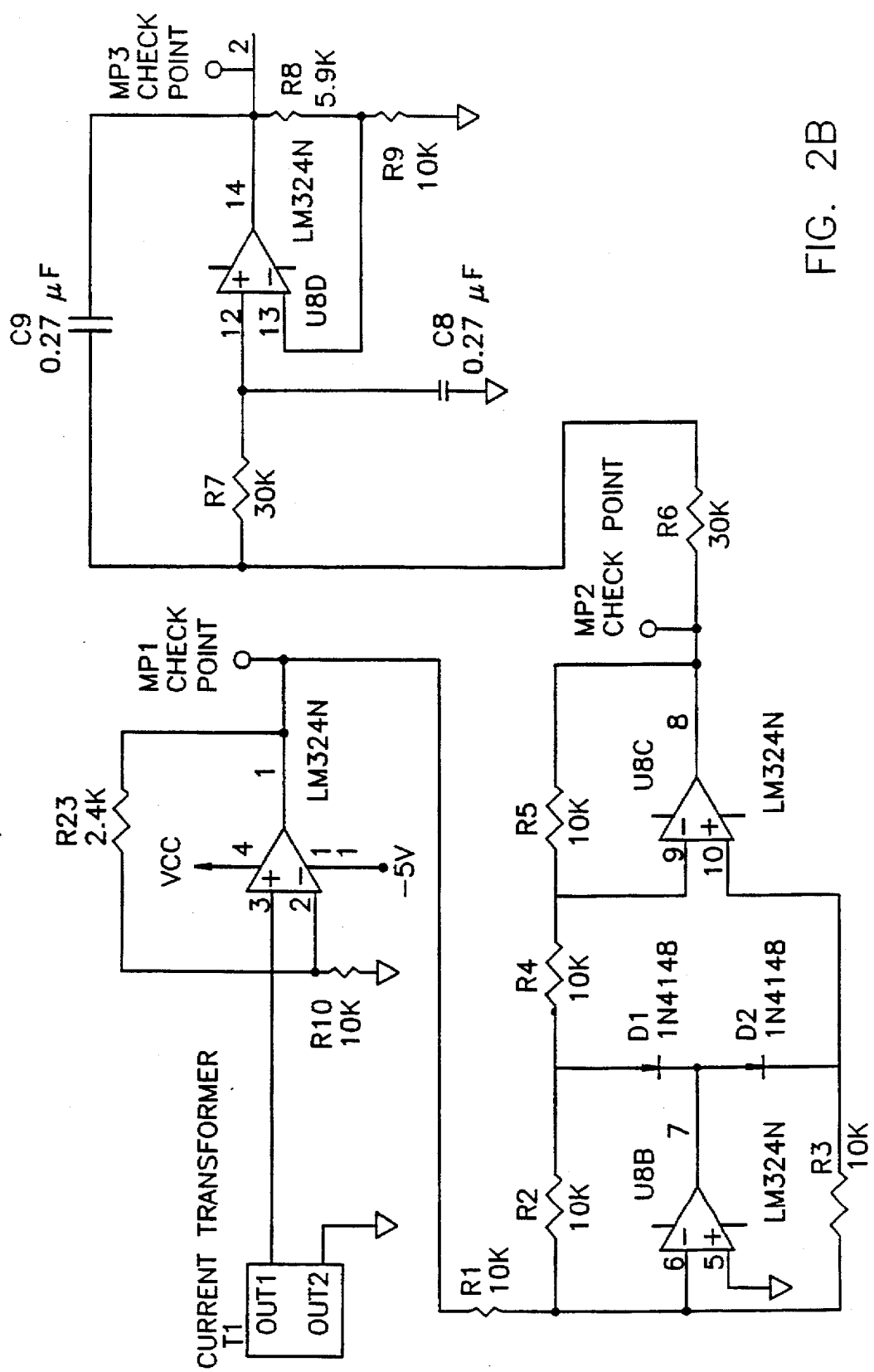
Figure 2C:
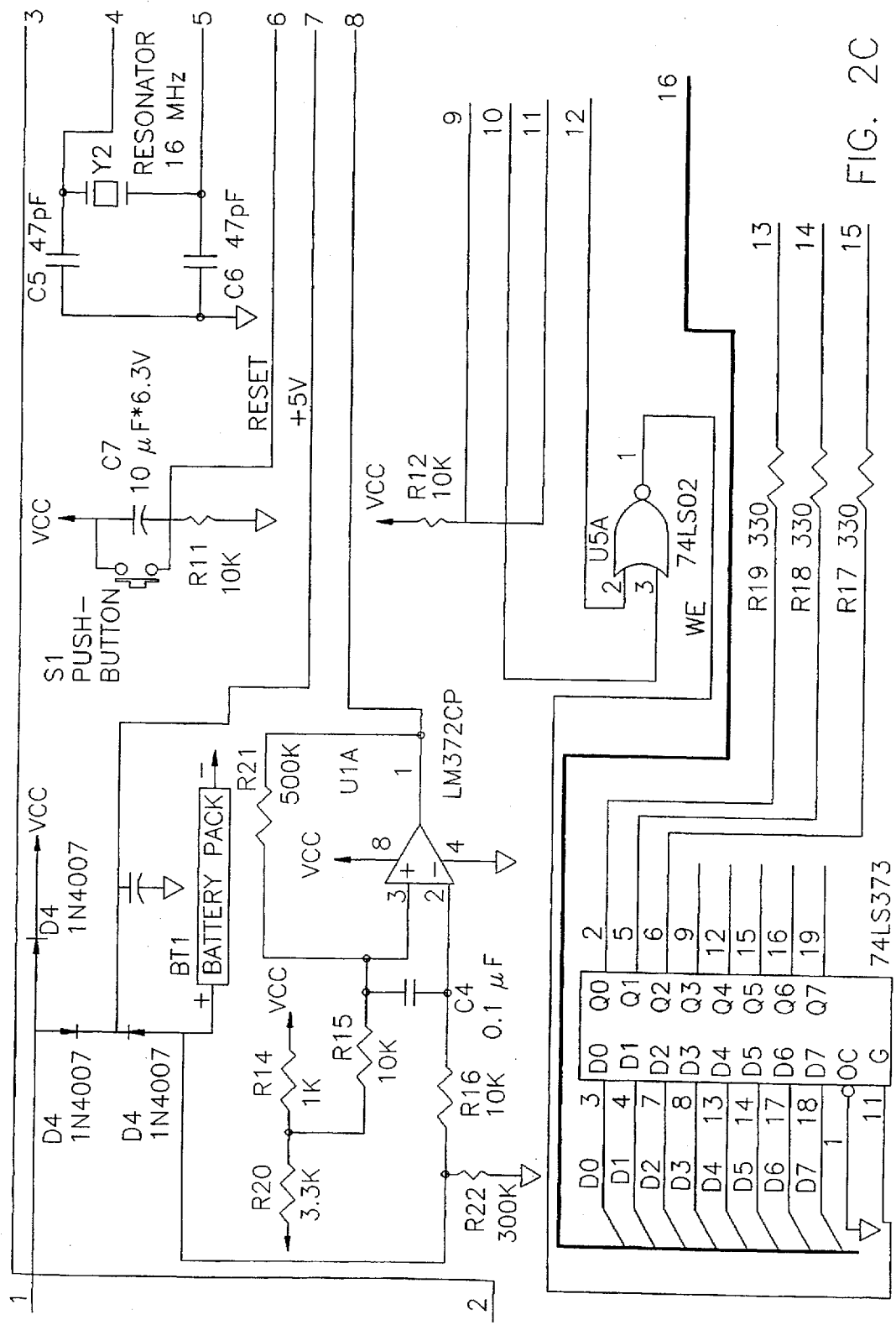

Reference is now made to FIG. 1 which illustrates an apparatus for detecting faults in the operation of electric motor-driven equipment constructed and operative in accordance with a preferred embodiment of the present invention. The apparatus of FIG. 1 comprises apparatus for detecting faults in the working of motor driven components of a heating, cooling, or dehumidifying unit, comprising:

a) a current sensor 110 which is connectable to the power lead of the motors of the unit, said sensor being connected to b) a demodulator 120 being connected to c) a low pass filter 130 which is connected to d) an A–D converter 140 which is connected to e) a micro-controller 150 containing an appropriate algorithm program, which is connected to f) a memory 170, both the micro-controller and the memory being connected to g) an indicating unit 160;

all said units being connected in an appropriate manner one after another.

The current sensor, being a secondary output, is, for example, a current transformer, advantageously of 20 amp; a magnetic amplifier; a shunt, etc.

Said output is a variable voltage signal proportional to the time-varying current flowing in the air conditioning power lead.

The demodulator is advantageously an active having a demodulating circuit, a multiplier, etc.

The low pass filters may be, for example, any of those mentioned in the following publications:

1. R. W. Hamming, Digital Filters, Prentice-Hall, Englewood Cliffs, 1983.

2. W. Press, S. Teukolsky, W. Veterling, B. Flannery, Numerical Recipes, Cambridge University Press, Cambridge, 1992.

An example of a suitable low pass filter is a Butterworth filter. Said filter, whose frequency is below 25 Hz removes effects associated with, e.g., the 50 Hz line frequency, its harmonics, and other unused signals.

The A–D converter should preferably have at least 6 bits. However, advantageously, it has 8 bits or even more.

The memory is advantageously battery powered for a case of unexpected line voltage drop. It may be, for example, an on-chip resident memory of a micro controller, an external CMOS memory, etc.

The micro-controller is preferably an embedded one, such as one from INTEL (U.S.A.) MCS—51 system.

The indicating unit may be any suitable one. It may be an integral part of the apparatus, i.e. be located within the housing or it may be located at a distance therefrom. It may be a display unit, an alarm unit, etc. It may show various lights or make various sounds, or even a combination of the two. Advantageously, for each fault there are at least two separate positions, i.e. one indicating the normal situation and one indicating the fault. However, there may also be additional positions comprising an intervening signal indicating that the situation is not normal but there is no urgency to repair it.

The display may have various arrangements for each fault. However, it may also only indicate that there is a fault in any of the various systems.

The present invention will be illustrated with reference to detecting insufficient refrigerant pressure. However, as indicated above, it is not restricted to detecting this fault or any other fault mentioned above. The detection of other faults appearing in said units may be envisaged. It is also appreciated that the detection of faults in any motor driven equipment may be envisaged.

If the unit is a chiller the main fault to be detected will be the clogging of the air filter.

The present invention also comprises a method for the detection of faults in the working of a unit as hereinabove defined, which method consists in sending a variable voltage signal being proportional to the time-varying current flowing in the power leads from the motors of the unit, which signal is sent and verified via a demodulator, a low pass filter and an A–D converter, to a micro controller, which may be programmed with a suitable computer program in which the signal is checked against the signal recorded in a memory, and then sent to the display unit.

As described above, the controller is preferably implemented in a combination of hardware and software. It is appreciated that the controller may also be implemented purely in hardware or by other means.

Figure 3:
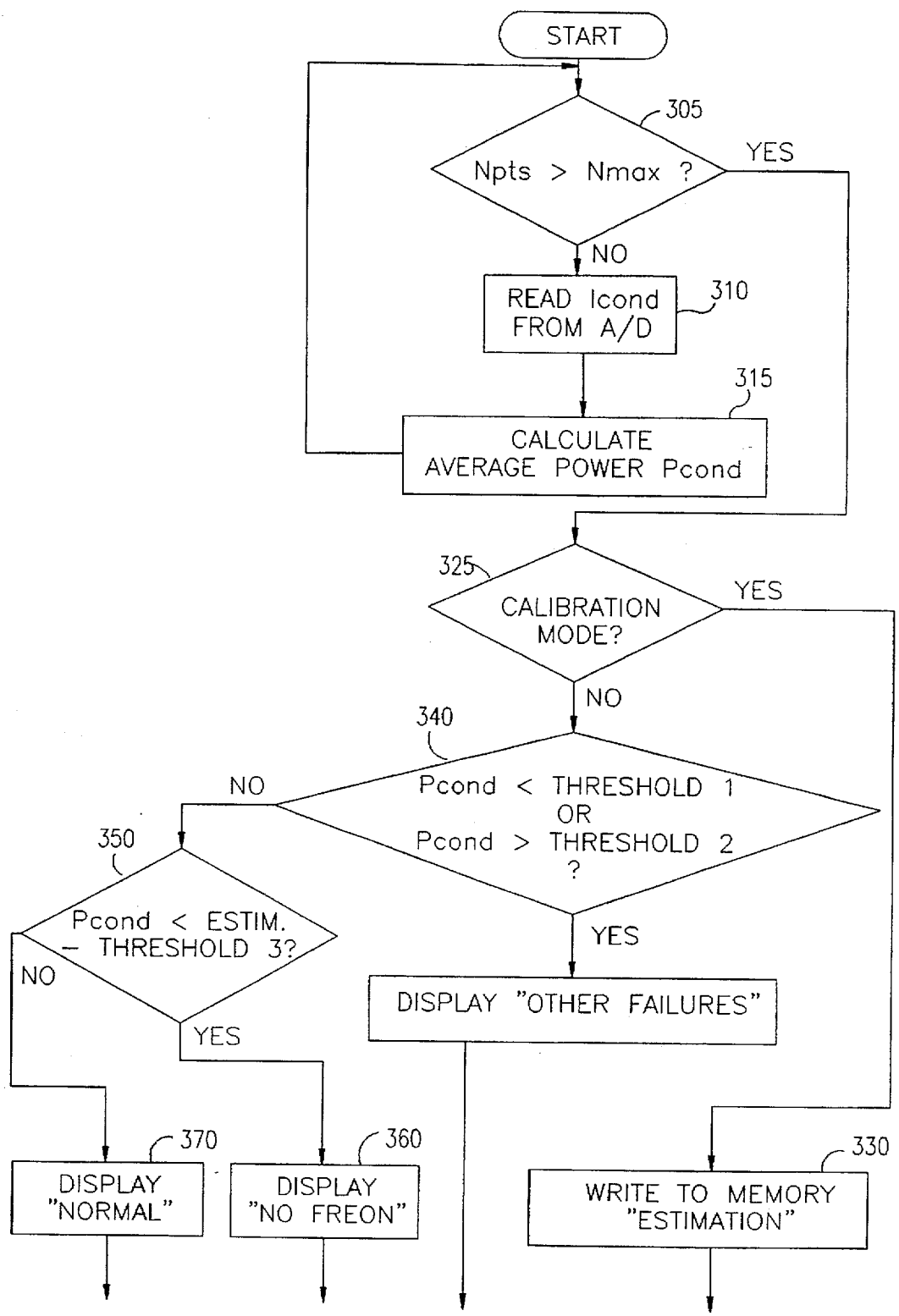
FIG. 3 is a flow chart illustrating a portion of the method performed by the apparatus of FIG. 1.

The present invention will now be illustrated with reference to the accompanying drawings, without being limited by them. Said drawings comprise:

FIG. 1, which is a block diagram of an apparatus constructed and operative in accordance with a preferred embodiment of the present invention;

FIGS. 2A–2D, which together constitute an electric circuit diagram of the apparatus shown in FIG. 1; and FIG. 3 shows a method which is suitable for checking the defects caused by insufficient refrigerant pressure and for detecting other defects.

The block diagram shown in FIG. 1 works as follows: The current sensor 110 secondary (output), which is a variable voltage signal proportional to the time-varying current flowing in the air conditioner power lead, is connected to the demodulator 120, being an active rectifier, which produces a DC voltage, proportional to the average value of air conditioner current.

The demodulated signal is fed through low pass filter 130, having an upper frequency cutoff below 25 Hz.

The conditioned voltage signal is then transformed to an 8-bit digital code by the A-to-D converter 140. The micro controller 150, upon occurrence of an appropriate event such as the receipt of an external signal, such as the pressing of an appropriately labeled pushbutton (not shown), reads this code and stores it in the memory 170, which is advantageously battery powered for a case of unexpected line voltage drop.

The code is regulated by the computer program stored in the micro controller 150.

This program is used as the basis for comparing further readouts (obtained without pressing the pushbutton) with the first readout. According to the results of this comparison, display 160 outputs a message: either NORMAL or NO REFRIGERANT or OPERATIONAL STAND BY (COMPRESSOR OFF), in the example of a detecting refrigerant pressure.

Reference is now made to Appendix A, which is a list of the various parts in the electric circuit diagram of FIGS. 2A–2D.

The operation of the method of FIG. 3 may be understood as follows:

Data Input: A sequence of consecutive current values is collected from the electric line powering the air conditioner. These values are denoted by $C(1), C(2), C(3), \ldots, C(N)$. N is preferably equal to 2048 in the case of the refrigerant checking application.

Data Transformation: We form the sum of the squares of the current values:

$$SUM(1)=C(1)*C(1)+C(2)*C(2)+ \ldots + C(N)*C(N)$$

where the operation * denotes multiplication.

Representation of Data Collection and Transformation Steps and Finding the Average P: We repeat steps 1 and 2M times, resulting in successive sums:

$$SUM(2), SUM(3), \ldots, SUM(M)$$

for M so large that the average $$P=[SUM(1)+SUM(2)+ \ldots + SUM(M)]/M$$

is unchanging or changes very little when an additional value of SUM is found and inserted into the average.

Diagnosing the Coolant State: During an initial calibration stage or in the course of research on a particular air conditioner, we determine a value Plow, which is stored in the memory as shown in block 330, to be used in this step (below). Similarly, our research results in a value Phigh. These values are defined for use in block 340, as follows:

if P<Plow then refrigerant levels are low if Plow<P<Phigh then operation is normal if P>Phigh then something else is wrong with the air conditioner.

The indications appearing in FIG. 3 have the following meanings:

CALIBRATION mode=A logical variable which is "YES" if the calibration button is pressed, and is "NO" if the calibration button is not pressed.
Display=Output via some kind of signal.
ESTIMATION=Average power level for normal operation.
Icond=InPut current signal.
Nmax=Maximum number of current readings to be sampled.
Npts=Present number of current readings in sample.
Pcond=Calculated average power.
START=Inflation step of program—done either at regular time intervals or upon a button being pressed.
Threshold 1=Lower bound on allowable average power level.
Threshold 2=Upper bound on allowable average power level.
Threshold 3=Permissible extent of deviation below ESTIMATION, for normal operation.

The program illustrated in FIG. 3 operates as follows: After START the program begins as indicated in block 310, reading the input current signal Icond coming through the sequence: Current Sensor 110, Demodulator 120, Low-Pass Filter 130 and A-to-D convertor 140. The average power Pcond is calculated after each readout, as indicated in block 315, until the number of reading Npts reaches the maximum number of readings Nmax, as indicated in block 305.

Now the program checks to see if the calibration button is pressed, as indicated in block 325. If the calibration button is pressed (CALIBRATION BUTTONPRESSED="YES") then the calculated average power Pcond is labeled "ESTIMATION" and is written to Memory 7, as shown in block 330. If it is "NO" then the condition to be checked, as indicated in block 340, is:

Pcond 4>THRESHOLD 1 or Pcond >=THRESHOLD 2

If either of these conditions is met then the average power is outside of the working range and we display the message "OTHER FAILURES". If both these expressions are false then another flow of the algorithm is carried out, as indicated in block 350 in which we calculate the difference ESTIMATION−THRESHOLD 3 and compare it with average Pcond.

If:
Pcond 4>ESTIMATION−THRESHOLD 3 then the output message is "NO REFRIGERANT", as indicated in block 360.

If
Pcond>ESTIMATION−THRESHOLD 3 Then the output message is "NORMAL" signifying normal operation as indicated in block 370.

The three messages "NO REFRIGERANT", "NORMAL" and "OTHER FAILURES" constitute the possible outputs. Upon outputting one of these, the program reaches completion, denoted by "END".

It is appreciated that the particular choice of data transformation described above is one particular example of how an abnormal state of operation is determined and is not meant to be limiting.

Reference is now made to FIG. 4, which is a flow chart illustrating an alternative embodiment of the method performed by the apparatus of FIG. 1. The method of FIG. 4 is as follows:

STEP 500: Evaluation of the calibration norm. Evaluation of the norm F during a "calibration" stage when the equipment is known to be operating correctly.

The norm F will generally be a nonlinear function of voltage values v and hence of the current values C. Its evaluation is sequential, not requiring the storage of lengthy sequences of current values, and possibly highly nonlinear. A suitable norm F may be, for example, the Truncated Sum Estimate for N values C sub 1, C sub 2, ..., C sub N given by $$F = \sum_{i=1}^{N} \{R(\alpha, v\ \text{sub}\ i) \text{abs}(v\ \text{sub}\ i)\}$$

where
v sub i=voltage corresponding to C sub i
R(alpha,v)=0. for v<alpha
R(alpha,v)=1, for v>alpha
alpha=(v sub MAX/1.414
for v sub MAX the maximum voltage value among values collected over a large prior sample collected during calibration.

An additional example of the norm F is given by the Histogram Function $$G = \sum_{i=1}^{N} \{R(\alpha, v\ \text{sub}\ i)\}$$

It is appreciated that the examples for the norm F given above are suitable for use with a wide variety of motor driven equipment.

STEP 510: Continuing evaluation of the operation norm. Continuing, realtime evaluation of the norm F with progressing time, and continuing comparison of its value with that obtained during the calibration period.

STEP 520: Evaluate performance based on comparison of norms. Determine, based on each comparison of the operation norm with the sorted calibration norm, if there is reason to believe that the performance has degraded.

STEP 530: Signal output device. Send a signal to an output device, as for example a light emitting diode of computer channel, informing it of whether performance has indeed degraded.

Reference is now made to FIGS. 5A–5F, which together constitute an electronic circuit diagram of an alternative embodiment of a portion of the apparatus of FIG. 1.

Reference is now made to Appendix B, which is a list of the various parts in the circuit diagram of FIGS. 5A–5F. Taken together with Appendix B, the circuit diagram of FIGS. 5A–5F is self-explanatory.

Reference is now made to Appendix C, which is a computer listing of a preferred software implementation of the method of FIG. 4. The program may be loaded and run with the INTEL (U.S.A.) MCS—51 microcontroller referred to above by loading it into program memory with a standard universal programmer such as, for example, an ALL-03A.

It is appreciated that the software components of the present invention may, if desired, be implemented in ROM (read-only memory) form. The software components may, generally, be implemented in hardware, if desired, using conventional techniques.

Figure 6:
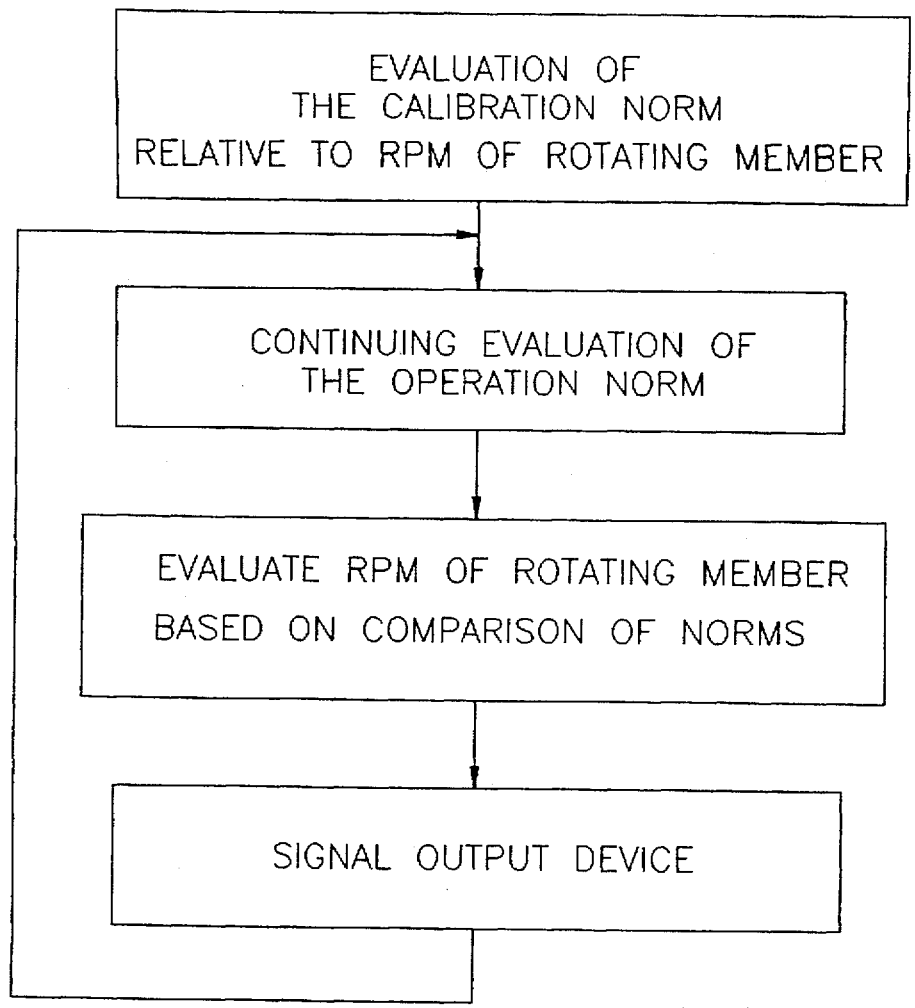
FIG. 6 is a flow chart illustrating a further preferred embodiment of the method performed by the apparatus of claim 1.

FIG. 6 is a flow chart illustrating a further preferred embodiment of the method performed by the apparatus of FIG. 1. The method of FIG. 6 is a particular application of the method shown in FIG. 4, in which the motor driven equipment comprises a rotating member and the controller is operative to detect the RPM of the rotating member.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

APPENDIX A

| Item | Quantity | Reference | Part |
|---|---|---|---|
| 1 | 1 | BT1 | BATTERY PACK |
| 2 | 1 | C1 | 2,000 uF*16 V |
| 3 | 4 | C2, C4, C10, C12 | 0.1 uF |
| 4 | 1 | C3 | 10 uF*6.3 V |
| 5 | 2 | C5, C6 | 47 uF |
| 6 | 1 | C7 | 10 uF*6.3 V |
| 7 | 2 | C8, C9 | 0.27 uF |
| 8 | 1 | C11 | 100 uF*6.3 V |
| 9 | 2 | C13, C14 | 33 uF |
| 10 | 1 | C15 | 47 uF*6.3 V |
| 11 | 1 | C15 | 470 uF*16 V |
| 12 | 2 | D1, D2 | 1N4148 |
| 13 | 4 | D3, D4, D5, D6 | 1N4007 |
| 14 | 2 | D7, D8 | BRIDGE 1A |
| 15 | 1 | D9 | LED GREEN |
| 16 | 1 | D10 | LED RED |
| 17 | 1 | D11 | LED YELLOW |
| 18 | 1 | K1 | 10 PIN TERMINAL |
| 19 | 2 | MP1, MP2 | CHECK POINT |
| 20 | 7 | R1, R2, R3, R4, R5, R9, R10 | 10K |
| 21 | 2 | R6, R7 | 30K |
| 22 | 1 | R8 | 5.9K |
| 23 | 4 | R11, R12, R15, R16 | 10K |
| 24 | 1 | R13 | 2M |
| 25 | 1 | R14 | 1K |
| 26 | 3 | R17, R18, R19 | 330 |
| 27 | 1 | R20 | 3.3K |
| 28 | 1 | R21 | 500K |
| 29 | 1 | R22 | 300K |
| 30 | 1 | R23 | 2.4K |
| 31 | 2 | S1, S2 | PUSHBUTTON |
| 32 | 1 | T1 | CURRENT TRANSFORMER |
| 33 | 1 | T2 | TRANSFORMER |
| 34 | 1 | U1 | LM372CP |
| 35 | 1 | U2 | ADC0805 |
| 36 | 1 | U3 | 87C52 |
| 37 | 1 | U4 | 74LS373 |
| 38 | 1 | U5 | 74LS02 |
| 39 | 1 | U6 | uA7805C |
| 40 | 1 | U7 | uA7905C |
| 41 | 1 | U8 | LM324N |
| 42 | 1 | Y2 | RESONATOR 500 kHz |
| 43 | 1 | Y2 | RESONATOR 16 MHz |

APPENDIX B

| Item | Quantity | Reference | Part |
|---|---|---|---|
| 1 | 2 | C1, C2 | 33 uF |
| 2 | 1 | C3 | 1000 uF*16 V |
| 3 | 8 | C4, C8, C9, C10, C11, C14, C15, C16 | 0.1 uF*15 V |
| 4 | 1 | C5 | 220 uF*16 V |
| 5 | 1 | C6 | 47 uF*6 V |
| 6 | 1 | C7 | 100 uF*6 V |
| 7 | 1 | C12 | 1 uF*15 V |
| 8 | 1 | C13 | 10 uF*6 V |
| 9 | 1 | D1 | LED GREEN |
| 10 | 1 | D2 | LED RED |
| 11 | 1 | D3 | LED YELLOW |
| 12 | 2 | D4, D5 | BRIDGE 1A 50 V |
| 13 | 2 | D6, D7 | PMLL4148 |
| 14 | 1 | KT1 | Terminal Block 15A/250 V |
| 15 | 7 | R1, R2, R3, R4, R5, R9, R11 | 10K |
| 16 | 3 | R6, R7, R8 | 330 |
| 17 | 1 | R10 | 6.8K |
| 18 | 1 | R12 | 150 |
| 19 | 1 | RV1 | VARISTOR 250 V 10 A |
| 20 | 1 | S1 | SW PUSHBUTTON |
| 21 | 1 | T1 | CURRENT TRANSFORMER |
| 22 | 1 | T2 | TRANSFORMER 220/2*9 V 2 VA |
| 23 | 1 | U1 | SN74LS373DW |
| 24 | 1 | U2 | 28C04(PLCC) |
| 25 | 1 | U3 | 80C550(PLCC) |
| 26 | 1 | U4 | uA7805C |
| 27 | 1 | U5 | MC79L05C |
| 28 | 1 | U6 | 27C256(PLCC) in socket |
| 29 | 1 | U7 | SN74LS02D |
| 30 | 1 | U8 | MC74F373DW |
| 31 | 1 | U9 | LM324D |
| 32 | 1 | U10 | TL7705ACD |
| 33 | 1 | Y1 | CRYSTAL 16 MHz |

26

APPENDIX C

```
:05000300032AFEFDFBD5
:10000E00E4F53DF53EF53FF54475540AE554D394B9
:10001E0000400B74492554F876FE155480EEC296B6
:10002E0090000174FEF0D296F568E4F524F525F5FE
:10003E0033F534F55FF55EF55DF55CF563F562F568
:10004E0061F560F567F566F565F564F52EC202C2D9
:10005E0001F549F538F537F536F535F53CF53BF54F
:10006E003AF539C200758CFC758A42D2A9D2AF75A9
:10007E008931D28C755409E554D3940040127449D9
:10008E002554F8E6FF744A2554F8A607155480E760
:10009E00C295755404E554D3940040187401255448
:1000AE00F582E43400F583E0FF743F2554F8A6078B
:1000BE00155480E1AF43AE42AD41AC408F298E283E
:1000CE008D278C26755404E554D39400401874057E
:1000DE002554F582E43400F583E0FF74442554F88A
:1000EE00A607155480E1AF48AE47AD46AC458F32FA
:1000FE008E318D308C2FD2952001030204CEC3E5B4
:10010E003494E8E53394034003020249C3E5259491
:10011E00A0E524940F50713002F2C3E52594C9E591
:10012E00249400501CAF38AE37AD36AC35120AAD44
:10013E00AC2EE41209571206CC8F388E378D368CC2
:10014E0035D3E52594D7E524940E401CAF3CAE3B49
:10015E00AD3AAC39120AADAC2EE41209571206CCE8
:10016E008F3C8E3B8D3A8C39AF63AE62AD61AC6025
:10017E00120AADAC2EE41209571206CC8F638E62B2
:10018E008D618C60C202808430000CC2969000019A
:10019E0074FEF0D296C2007F417EF07D007C00128C
:1001AE000AADAF38AE37AD36AC35120AAD7F437EF1
:1001BE00487D007C0012084F1208FE605E405C7F96
:1001CE00417EF07D007C00120AADAF3CAE3BAD3AF5
:1001DE00AC39120AAD7F437E487D007C0012084F79
:1001EE001208FE60364034AF67AE66AD65AC641281
:1001FE000AADAF63AE62AD61AC60120AAD7F457EF3
:10020E007A7D007C0012084F1206CC8F678E668DA9
```

SUBSTITUTE SHEET (RULE 26)

27

```
:10021E00658C640534E53470020533E4F524F52568
:10022E00F538F537F536F535F53CF53BF53AF53954
:10023E00F563F562F561F56002010CE4F533F53412
:10024E00AF67AE66AD65AC64120AAD7F447E7A7D53
:10025E00007C0012084F8F678E668D658C648F321E
:10026E008E318D308C2FC2A98F488E478D468C458E
:10027E00C295755404E554D3940040337444255408
:10028E00F8E6FF74052554F582E43400F583EFF0AB
:10029E00753D01753E5ED3E53E9400E53D9400400C
:1002AE000AE53E153E7002153D80EB155480C6D210
:1002BE0095D2A975670075660075650075640C3F3
:1002CE00E53494E8E533940340030204 45C3E52581
:1002DE0094A0E524940F40030203CB3002EFAF321B
:1002EE00AE31AD30AC2F120AADAC2EE4120957125E
:1002FE0006C88F5B8E5A8D598C58C3E52594C9E577
:10030E0024940050387F007E007D007C00120AADE0
:10031E00AF5BAE5AAD59AC581208FE6020401EAF0E
:10032E0038AE37AD36AC35120AADAF5BAE5AAD59FD
:10033E00AC581206CC8F388E378D368C35D3E525DA
:10034E0094D7E524940E40387F007E007D007C001B
:10035E00120AADAF5BAE5AAD59AC581208FE602012
:10036E00401EAF3CAE3BAD3AAC39120AADAF5BAE00
:10037E005AAD59AC581206CC8F3C8E3B8D3A8C3907
:10038E007F007E007D007C00120AADAF5BAE5AADE1
:10039E0059AC581208FE6020401EAF63AE62AD61CC
:1003AE00AC60120AADAF5BAE5AAD59AC581206CC6A
:1003BE008F638E628D618C60C2020202DB7F007ED3
:1003CE00007D007C00120AADAF38AE37AD36AC35CD
:1003DE001208FE604240407F007E007D007C0012CD
:1003EE000AADAF3CAE3BAD3AAC391208FE602840C8
:1003FE0026AF67AE66AD65AC64120AADAF63AE6292
:10040E00AD61AC601206CC8F678E668D658C64050F
:10041E0034E53470020533E4F524F525F538F53767
:10042E00F536F535F53CF53BF53AF539F563F562FC
:10043E00F561F5600202CDE4F533F534AF67AE66D3
:10044E00AD65AC64120AAD7F447E7A7D007C0012ED
```

28

```
:10045E00084F8F678E668D658C648F298E288D2749
:10046E008C26C2A98F438E428D418C40C295755405
:10047E0004E554D394004033743F2554F8E6FF74DA
:10048E00012554F582E43400F583EFF0753D0175D6
:10049E003E5ED3E53E9400E53D9400400AE53E15F0
:1004AE003E7002153D80EB155480C6D295C201D226
:1004BE00A97567007566007565007564000205F91B
:1004CE00C3E52594A0E524940F505B3002F2AF32C1
:1004DE00AE31AD30AC2F120AADAC2EE4120957126C
:1004EE0006C88F5B8E5A8D598C587F007E007D001A
:1004FE007C00120AADAF5BAE5AAD59AC581208FE75
:10050E006020401EAF5FAE5EAD5DAC5C120AADAF5B
:10051E005BAE5AAD59AC581206CC8F5F8E5E8D5DB8
:10052E008C5CC202809A7F007E007D007C00120AE5
:10053E00ADAF5FAE5EAD5DAC5C1208FE7005754A88
:10054E00FB802E7F3F7E337D337C33120AADAF2985
:10055E00AE28AD27AC261207D7120AADAF5FAE5E3E
:10056E00AD5DAC5C1208FE5005754AFD8003754A00
:10057E00FEE4F554E554C394035035E4F557F555B0
:10058E00E555C3940A5016742A2554F8E6FF744AAA
:10059E002555F8E6B507020557055580E3E557D30F
:1005AE0094074008742A2554F8E6F556055480C47D
:1005BE00E556B4FB05752DFB8027053FE556B4FDCA
:1005CE00020544E53FD394644014E544D3940F40B0
:1005DE00057568FD80037568FEE4F53FF544856892
:1005EE002DC296900001E52DF0D296E4F524F52566
:1005FE00F533F534F55FF55EF55DF55C02007922B5
:03000B0002060EDC
:10060E00C0E0C0F0C083C082C0D0C000C001C00234
:10061E00C003C004C005C006C007758CFC758A42B5
:10062E0012064CD007D006D005D004D003D002D08D
:0E063E0001D000D0D0D082D083D0F0D0E032F6
:10064C002093450549E549D3940A4055D201C296F9
:10065C0090000174F8F0D296D200755F00755E00C0
:10066C00755D00755C00756300756200756100755E1
:10067C00600007567007566007565007564000E4F5CB
```

SUBSTITUTE SHEET (RULE 26)

29

```
:10068C0024F525F533F53422E4F549C294900000A5
:10069C00E0F52EE4F0D294D2020525E52570020592
:0206AC00242206
:1006AE00DA0CD902800BD906301F01B35005020AAD
:1006BE0000921F0209ECD9F680F9D21E8002C21EEA
:1006CE00120A31301E06C86002B21FC8921EDAD05E
:1006DE00D9E4B8000A120A78A21E921F0209D56048
:1006EE00FBB50E00400F120A78A21E92F7A21F92BF
:1006FE001EA2F7921FC398F40424E740DF2419AD1D
:10070E000AAC09AB087A00C394084008CDCCCBFAEA
:10071E00E4CD80F424086010F9C3ED13FDEC13FC56
:10072E00EB13FBEA13FAD9F1A21E301F01B34030CE
:10073E008A12E50B2BF513E50C3CF514E50D3DF592
:10074E0015501A13F515E51413F514E51313F513D7
:10075E00E51213F512050EE50E7002050F02098B58
:10076E00E4C39AF512E50B9BF513E50C9CF514E525
:10077E000D9DF515500DB21FC378127F04E496F649
:10078E0008DFFA7A047019E50EC39408F50E5002CC
:10079E00150FE4C512C513C514F515DAE8020A2CB7
:1007AE0020E7BAE50E7002150F150E7812C37F04FE
:0807BE00E633F608DFFA80E8DB
:1007C600DA03B80003020A00D9028002D9F7020947
:1007D600EC120A31301F01B3921F7004D9E780056D
:1007E600DADEB80003020A2CD9E2C3947E50021561
:1007F6000F250EF50E5002050F7810760008B81674
:10080600FA78087910E608FAE8FC780B8AF0E60828
:10081600A427F709E5F037F7500989F00907E760DB
:10082600FBA9F0B80EE61919ECF8B80BD802098B3B
:10083600020A17B8FFFA020A00D9FB0209ECDAF637
:10084600B800F0020A2C120A8E120A31301F01B3C8
:10085600921F7007D9E3B800E280DBDAE1B8000244
:1008660080E1D9D5C8C3985002150F247F500205E0
:100876000FF50E781576007A1A7B80C3E50B95087E
:10088600E50C9509E50D950A4016C3E50B9508F5A7
:100896000BE50C9509F50CE50D950AF50DE64BF6FD
:1008A600DA0302098BEB03FB30E703187600C3E596
```

SUBSTITUTE SHEET (RULE 26)

30

```
:1008B6000B33F50BE50C33F50CE50D33F50D40CA9E
:0508C60030E7DD80B603
:1008CB00D908A21F301E01B3400A120A00748022FD
:1008DB00DAF8D9ECA21E921ED082D083120AD4C0B1
:1008EB0083C082A21EE492E1B2E11422D9DCA21FE2
:1008FB00B380E3120A31921EDAD6D9F0A21F301E52
:10090B0001B35005A21FB380CDFEFFC3985004AFB7
:10091B000EF404C3136009C3EE98301FB9B380B64D
:10092B00EFF516B21EEED083D0821206E0C082C065
:10093B0083E8600EC516C3951694145005A21FB319
:04094B0080A3E4227F
:10094F007920800C7910800479087D007E007F006B
:10095F003392D530D503120A9FEC33400FEF33FF9C
:10096F00EE33FEED33FDEC33FCD9EE22EECCF5F099
:0C097F00747E29A2D513FF92F7AEF0227F
:10098B00E51520E7137812C37F04E633F608DFFA88
:10099B00E50E7002150F150EE5123378137F03E683
:1009AB003400F6500E08DFF7751580050EE50E7056
:1009BB0002050FE50F20E7547027E50E604E04602B
:1009CB002085150D85140C85130B5323F0AC0BAD43
:1009DB000CA21FE50E13FFE50D92E7FEA80E020A0F
:1009EB00D4E4F50DF50CF50BF50F750EFF5323F055
:1009FB0043230580D874FFF50DF50CF50B750F002F
:100A0B00F50ED21F5323F043230980C15323F04328
:100A1B002303E4F50DF50CF50BF50FF50EC21F8056
:060A2B00AC5323F080EC47
:100A310079017A01850DF0E50EA2F733921F750F4A
:100A410000F50E6002D2F785F00DA80EB8FF080977
:100A5100E50DC2E76001098C088D098EF0A2F7EF60
:100A61003304700A0AC2F705F00AD5F0011A1460BE
:070A710002D2F785F00A2212
:100A7800C8880EC50DC50AC50DC50CC509C50CC568
:060A88000BC508C50B229E
:03000000020AEC05
:0C0AEC00787FE4F6D8FD758168020B33BA
:100A8E00CFC50ECFCEC50DCECDC50CCDCCC50BCCA6
```

SUBSTITUTE SHEET (RULE 26)

31

```
:010A9E002235
:0E0A9F00C3E49FFFE49EFEE49DFDE49CFC2268
:100AAD00E51705176010D0F0D0E0C00BC00CC00DDD
:100ABD00C00EC0E0C0F08F0E8E0D8D0C8C0B22AFD2
:100ACD000EAE0DAD0CAC0BE517146010D0F0D0E0F0
:0F0ADD00D00ED00DD00CD00BC0E0C0F0151722FA
:100AF80002000EE493A3F8E493A34003F68001F206
:100B080008DFF48029E493A3F85407240CC8C333FE
:100B1800C4540F4420C8834004F456800146F6DFCD
:100B2800E4800B0102040810204080900003E47E5A
:100B3800019360BCA3FF543F30E509541FFEE493C2
:100B4800A360010ECF54C025E060A840B8E493A389
:100B5800FAE493A3F8E493A3C8C582C8CAC583CAB4
:100B6800F0A3C8C582C8CAC583CADFE9DEE780BE6C
:0100080000F7
:00000001FF
```

What is claimed is:

1. Apparatus for monitoring the functioning of motor driven equipment comprising:
   current sensing apparatus connectable to the power input of the motor and producing a current signal;
   signal correction apparatus receiving as input said current signal and operative to demodulate said current signal, filter said current signal to retain low frequencies thereof, and convert said current signal from analog to digital form and producing a corrected signal;
   a memory;
   a controller in operative connection with said memory, receiving said corrected signal and having a calibration state and an operation state and operative, when in the calibration state, to compute the calibration norm of said corrected signal based partly on data contained in said memory and to store said calibration norm in said memory and operative, when in the operation state, to compute the operation norm of said corrected signal based partly on data contained in said memory and to compare said operation norm with said stored calibration norm and to produce a function signal indicating the functioning of said motor driven equipment; and
   an indicating unit receiving as input said function signal and producing an output indication of the functioning of said motor driven equipment.

2. Apparatus according to claim 1, wherein the current sensing apparatus comprises a current transformer.

3. Apparatus according to claim 1, wherein the current sensing apparatus comprises a magnetic amplifier.

4. Apparatus according to claim 1, wherein the current sensing apparatus comprises a shunt.

5. Apparatus according to claim 1 wherein the motor driven equipment comprises a fan.

6. Apparatus according to claim 1 wherein the motor driven equipment comprises a rotating member and wherein the controller is operative to detect the rate of rotation of the rotating member.

7. Apparatus according to claim 1, wherein the indicating unit comprises a display.

8. Apparatus according to claim 1, wherein the indicating unit comprises an alarm.

9. Apparatus according to claim 1 wherein the signal correction apparatus comprises low pass filter apparatus operative to filter said current signal to retain low frequencies thereof, and
   wherein the low pass filter apparatus comprises a Butterworth filter.

10. Apparatus according to claim 1 wherein the signal correction apparatus comprises A-D conversion apparatus operative to convert said current signal from analog to digital form, and
    wherein the A-D conversion apparatus has at least 6 bits.

11. Apparatus according to claim 10 wherein the A-D conversion apparatus has at least 8 bits.

12. Apparatus according to claim 1, wherein the motor driven equipment comprises an air conditioning unit and the controller is operative to detect a first defect comprising insufficient refrigerant pressure.

13. Apparatus according to claim 12 wherein the controller is also operative to detect at least one additional defect.

14. Apparatus according to claim 1, wherein the motor driven equipment comprises a chiller and the controller is operative to detect a first defect comprising clogging of an air filter.

15. Apparatus according to claim 14 wherein the controller is also operative to detect at least one additional defect.

16. Apparatus according to claim 1 wherein the motor driven equipment comprises a heat pump.

17. Apparatus according to claim 16 wherein the heat pump has a plurality of modes of heating and the controller is operative to detect the mode of heating of the heat pump.

18. Apparatus according to claim 1 wherein the motor driven equipment comprises refrigeration equipment.

19. Apparatus according to claim 18 wherein the refrigeration equipment comprises evaporator coils and wherein the controller is operative to detect the growth of frost on the evaporator coils.

20. Apparatus according to claim 1 wherein the motor driven equipment comprises a fluid pump.

21. Apparatus according to claim 20 wherein the controller is operative to detect faults in the pump.

22. Apparatus according to claim 20 wherein the controller is operative to detect the rate of flow of the fluid.

23. Apparatus according to claim 22 wherein the controller is also operative to control the operation of the pump.

24. Apparatus according to claim 1 wherein the signal correction apparatus comprises demodulating apparatus operative to demodulate said current signal, and
    wherein the demodulating apparatus comprises an active rectifier.

25. A method for monitoring the functioning of motor driven equipment comprising:
    sensing the current in the power input of the motor and producing a current signal;
    demodulating said current signal, filtering said current signal to retain low frequencies thereof, and converting said current signal from analog to digital form and producing a corrected signal;
    receiving said corrected signal, retrieving at least one stored corrected signal from said memory and comparing said corrected signal with said stored corrected signal and producing a function signal indicating the functioning of said motor driven equipment;
    receiving said corrected signal and having a calibration state and an operation state and, when in the calibration state, computing the calibration norm of said corrected signal based partly on stored data and storing said calibration norm and, when in the operation state, computing the operation norm of said corrected signal based partly on stored data and to comparing said operation norm with said stored calibration norm and producing a function signal indicating the functioning of said motor driven equipment; and
    receiving said function signal and producing an output indication of the functioning of said motor driven equipment.

\* \* \* \* \*